United States Patent
Curtz et al.

[11] 3,812,724
[45] May 28, 1974

[54] ROTATIONAL BALANCER

[76] Inventors: William C. Curtz, 8621 Fauntleroy Way, S.W., Seattle, Wash. 98116; Merkham J. Matson, 17680 S.W. Blue Heron Way, Lake Oswego, Wash. 97034

[22] Filed: Dec. 16, 1971

[21] Appl. No.: 208,977

Related U.S. Application Data

[63] Continuation of Ser. No. 859,503, Sept. 19, 1969, abandoned.

[52] U.S. Cl. .................... 73/458, 73/468, 74/573 F
[51] Int. Cl. ....................... G01m 1/16, G01m 1/36
[58] Field of Search .......... 74/573 F, 573 R; 73/66, 73/458, 468, 469

[56] References Cited
UNITED STATES PATENTS

| | | | |
|---|---|---|---|
| 2,375,635 | 5/1945 | Dyer | 74/573 F |
| 2,534,268 | 12/1950 | Villiers | 73/468 |
| 2,549,756 | 4/1951 | Clarr | 74/573 F |
| 3,016,751 | 1/1962 | Villiers | 73/468 |
| 3,597,882 | 8/1971 | Riddington | 74/573 X |

FOREIGN PATENTS OR APPLICATIONS

| | | | |
|---|---|---|---|
| 562,550 | 10/1932 | Germany | 73/468 |
| 186,173 | 2/1967 | U.S.S.R. | 73/468 |
| 189,200 | 4/1967 | U.S.S.R. | 73/468 |

*Primary Examiner*—James J. Gill
*Attorney, Agent, or Firm*—Christensen, O'Connor, Garrison & Havelka

[57] ABSTRACT

A rotating system for counterbalancing an off-center mass causing dynamic imbalance in a rotating body is provided. A fluid reservoir comprising a plurality of fluid accumulators disposed about a rotatively mounted body with interconnecting fluid passages communicating with each other in a circuit about the geometric axis and with the accumulators such that rotation of the body distributes a fluid into the accumulators variably in accordance with dynamic unbalance of the rotating system so as to return the rotation system toward rotational equilibrium.

The amount of fluid contained in each of the plurality of fluid accumulators may be taken as an indication of the amount and angular location of dynamic imbalance.

23 Claims, 9 Drawing Figures

INVENTORS
MARKHAM J. MATSON
WILLIAM C. CURTZ
BY
Christensen, Sanborn & Matthews
ATTORNEYS

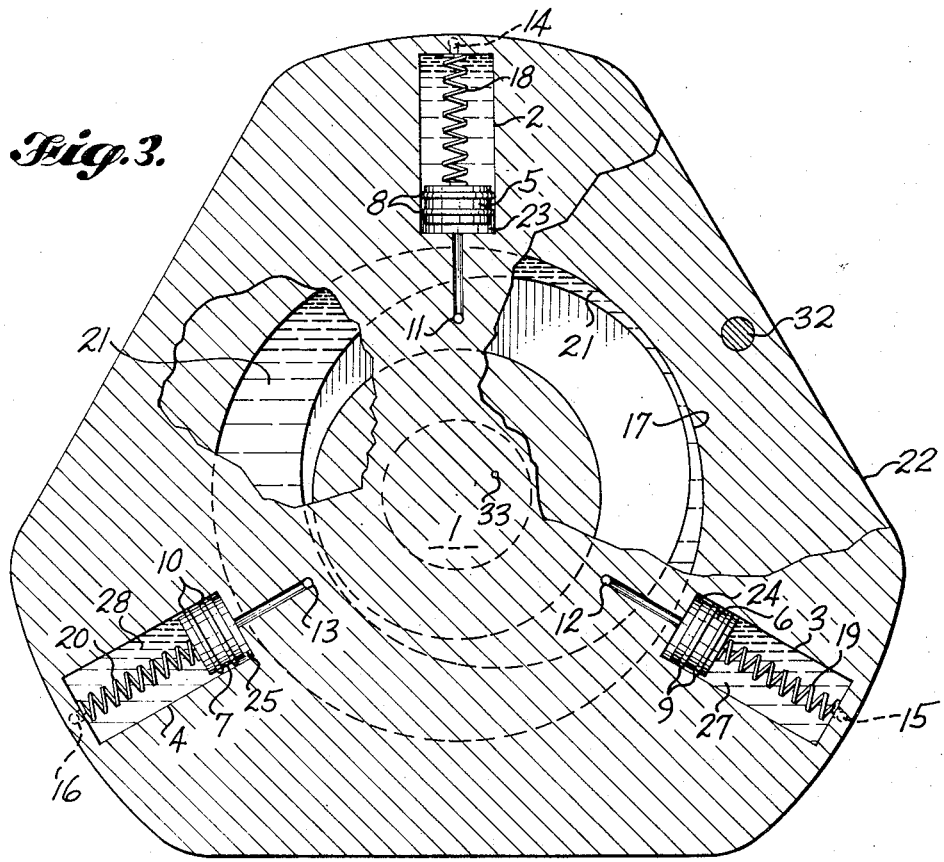

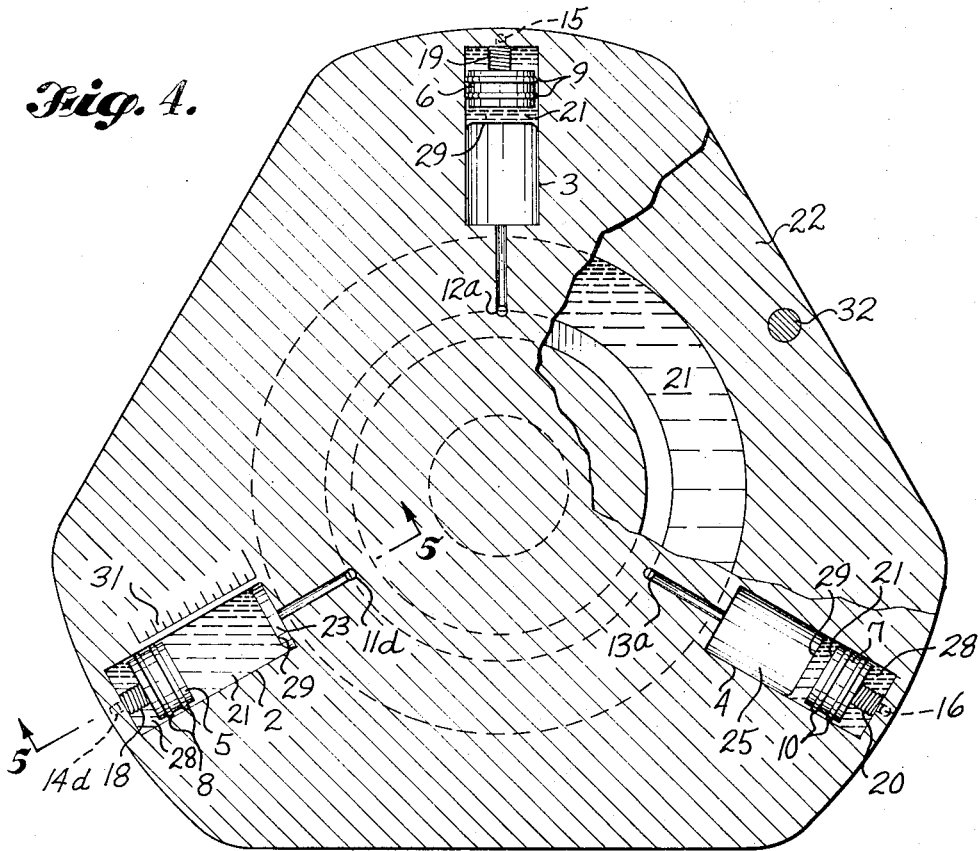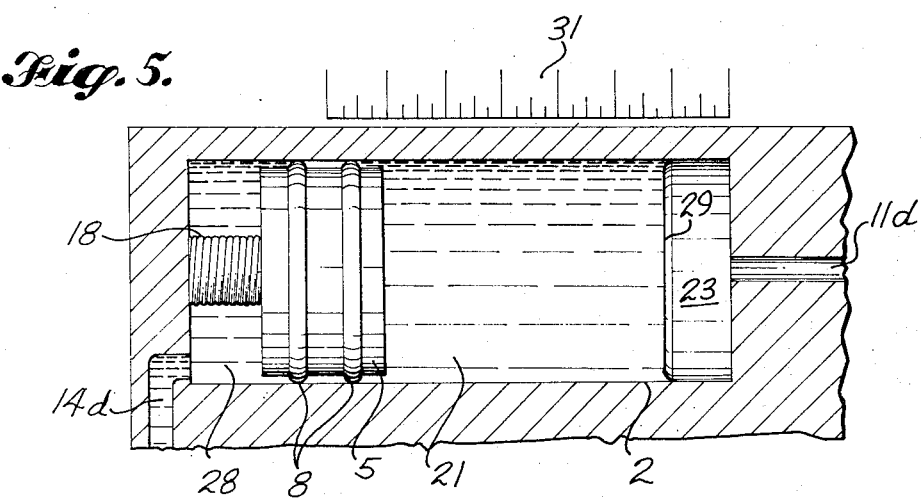

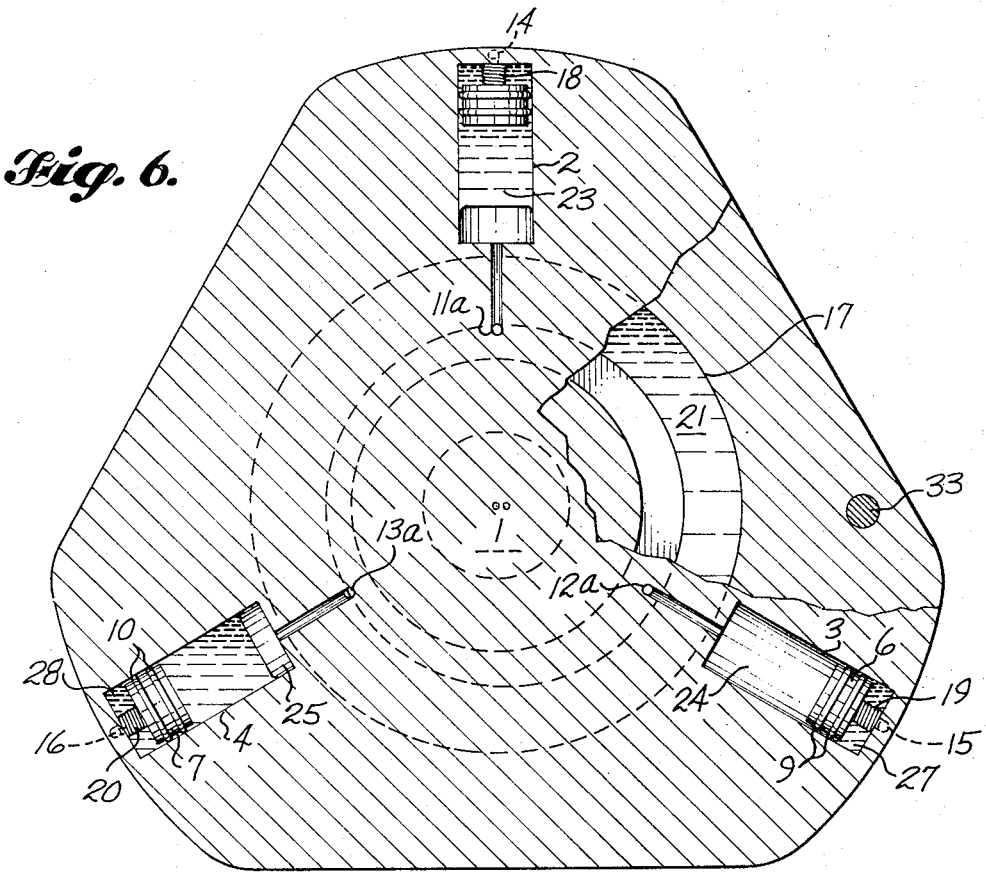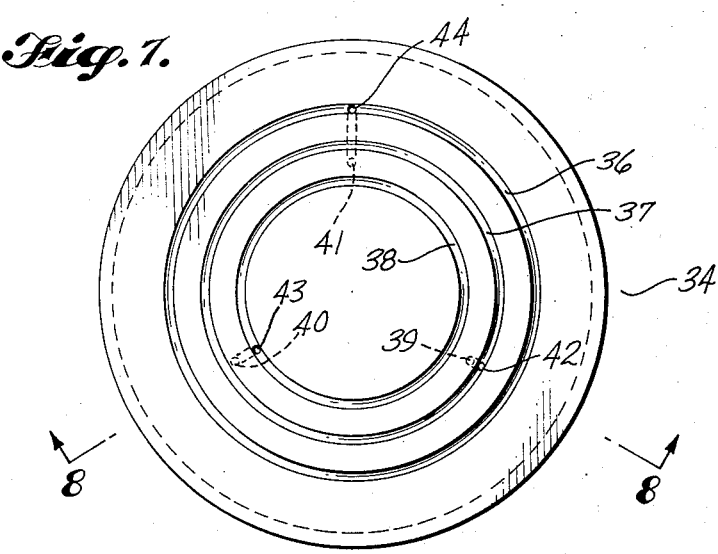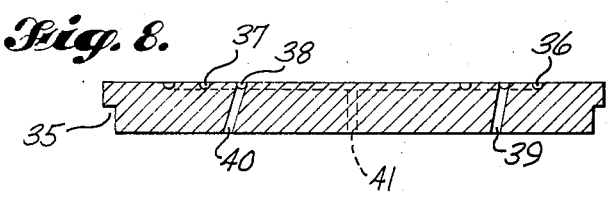
INVENTORS:
MARKHAM J. MATSON
WILLIAM C. CURTZ
BY
Christensen, Sanborn & Matthew
ATTORNEYS

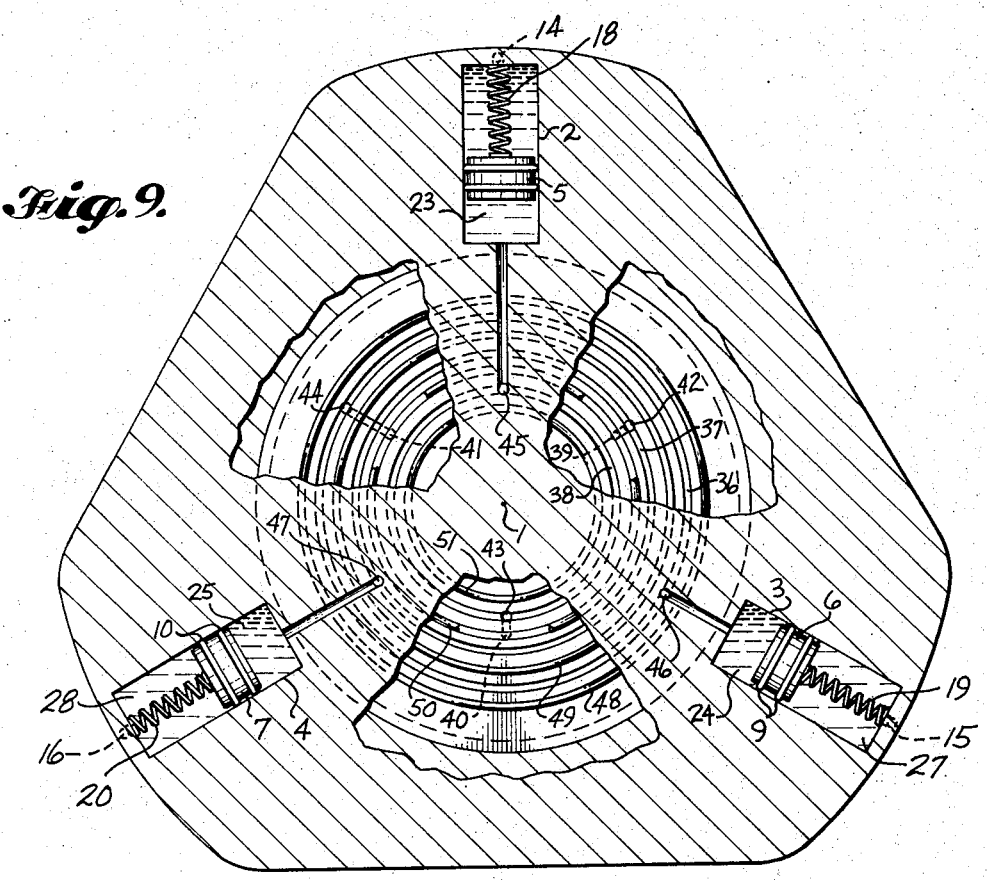

ROTATIONAL BALANCER

This application is a continuation of application Ser. No. 859,503 which was filed Sept. 19, 1969, and is now abandoned.

FIELD OF THE INVENTION

This invention relates to a device for balancing a rotating member. This invention further relates to a device for shifting the mass of a rotating member to achieve rotational balance about the geometric axis of rotation. One aspect of this invention relates to a device which may be used to measure the angular location and amount of out of balance of a rotating member.

Achieving and maintaining rotational balance in equipment such as electrical generating equipment, heavy gyroscopes, internal combustion engines, aircraft propellers, helicopter rotors, electric motor armatures, steam and water turbines and the like is frequently a critical factor in the design and operation of such equipment. Heretofore it has been necessary to shutdown and repair equipment when an out of balance condition arises. Frequently, in equipment having a very large mass or a particularly high rate of angular velocity, sudden out of balance situations such as resulting from loss of a part of the rotating member frequently have caused catastrophic failure with severe damage to the rotating device and its associated equipment. Also, in the operation of rotating equipment it is frequently desirable to evaluate the amount of out of balance and its location for subsequent repair on shutdown of the equipment. This invention provides a device having means to shift the mass of a rotating member in response to an out of balance situation in the rotating member. The condition of the device upon reaching equilibrium may be taken as a measurement of the location and amount of out of balance of the rotating member.

PRIOR ART

Among the systems already proposed to effect this result are those which make use of a plurality of movable spherical weights positioned symmetrically about the shaft of the machine and which are so arranged as to be free for movement along an arcuate path concentric with the shaft in response to an out of balance situation and in compensation thereto. Rings of sufficiently great mass placed on the shaft have also been employed to effect automatic rebalance and operate on the same principle as the movable spherical weights, that is to say by an automatic change in position along the arcuate path concentric with the shaft axis. Devices of these types are capable of compensating an imbalance both as to direction and magnitude limited by the mass of the spheres or rings. Such devices are not without many inherent disadvantages. For instance they are applicable only to cases where the machine operates at rotary speeds in excess of the critical angular velocity which will cause the rings or spheres to physically move to their new position. By critical speed it is meant that number of revolutions per unit of time which corresponds to the natural or resonant frequency of the mass which is being rotated. A condition required for use of such prior art devices is a sufficiently flexible mounting installation for the rotating mass.

Another disadvantage inherent in the prior art automatic rebalancers of the movable sphere or ring type is an inability to respond fully and accurately to correct a condition of imbalance. This arises from the fact that the change in ball or roller position to bring about a rebalance is made dependent only upon the very slight inclination of the rolling path brought about by the imbalance. Consequently the presence of any roughness along the path or friction therein can easily lower the response sensitivity of the balancer. Fluid balancers also are known to the prior art; for example, U.S. Pat. No. 1,209,730 to M. Leblanc discloses a rotational balancer which offsets an unbalanced mass by a shift of liquid in an annular channel disposed about the rotating member. This device has the inherent disadvantage of being able to cope with only a part of the out of balance phenomena since it is essential to have the geometric center of the device not coincide with the center of mass or no buildup of the liquid will occur on the side opposite the unbalanced mass. Thus, only partial balancing is possible with the liquid shift devices of the prior art.

SUMMARY OF THE INVENTION

This invention provides a device having means to shift the mass of a rotating member in response to rotational imbalance to quickly, efficiently and completely counterbalance the imbalance, permitting operation of the rotating device without damage thereto. The condition of the device upon reaching equilibrium may be taken as a measurement of the location and amount of imbalance of the rotating member. The rotational balancing device comprises a rotating body having a fluid reservoir disposed about the geometric center of rotation of the body. At least one fluid chamber is disposed radially about the center of rotation of the device, and is in communication with the fluid reservoir to permit fluid flow therebetween. Rotation of the body causes the fluid to be distributed in accordance with the dynamic imbalance experienced by the rotating body so as to return the rotating body toward rotational balance. This is accomplished by placing the entrance to the duct which runs between the chambers and the fluid vessel in such a location that it is covered with a liquid or a gas depending upon the condition of rotational imbalance experienced by the body. The actual center of rotation is located at some point between the geometric center of rotation of the device and the center of mass of the device, the location depending upon the amount of movement possible in the mounting shaft of the rotating body.

When the device is rotating, the liquid contained in the fluid reservoir assumes a configuration having an inner diameter concentric with the actual center of rotation rather than the geometric center of the device. The chambers opposite an unbalanced mass will therefore have the entrance to the duct between the fluid reservoir and the chamber in liquid communication with the liquid contained in the fluid reservoir while the chambers adjacent the imbalance will be in fluid communication with an area of the fluid reservoir which contain no liquid. Fluid from the fluid reservoir is caused to enter the chambers, those opposite an unbalanced mass thus receiving liquid and those adjacent the unbalanced mass receiving gas, so that the unbalanced mass is effectively counterbalanced and rotational equilibrium restored.

DESCRIPTION OF THE DRAWINGS

The objects and concepts of this invention will be more clearly pointed out and easily understood by reference to the following description and to the drawings wherein:

FIG. 3 shows the device of FIG. 1 rotating at a low angular velocity having an unbalanced mass at point 32.

FIG. 4 shows the device of FIG. 3 rotating at a high rate of speed.

FIG. 5 shows an enlarged partial cross-sectional view of one chamber taken along line 5—5 of FIG. 4.

FIG. 6 shows the device of FIG. 3 rotating at a high rate of speed with an imbalance at 33.

FIG. 7 shows a device for changing the fluid inlet locations for the fluid cylinders of the rotational balancer.

FIG. 8 shows a cross section of the device shown in FIG. 7 taken along line 8—8 of FIG. 7.

FIG. 9 shows a top view partly in section of the device of this invention with the disc shown in FIG. 7 installed therein.

DESCRIPTION OF THE PREFERRED EMBODIMENT

Figure 1:
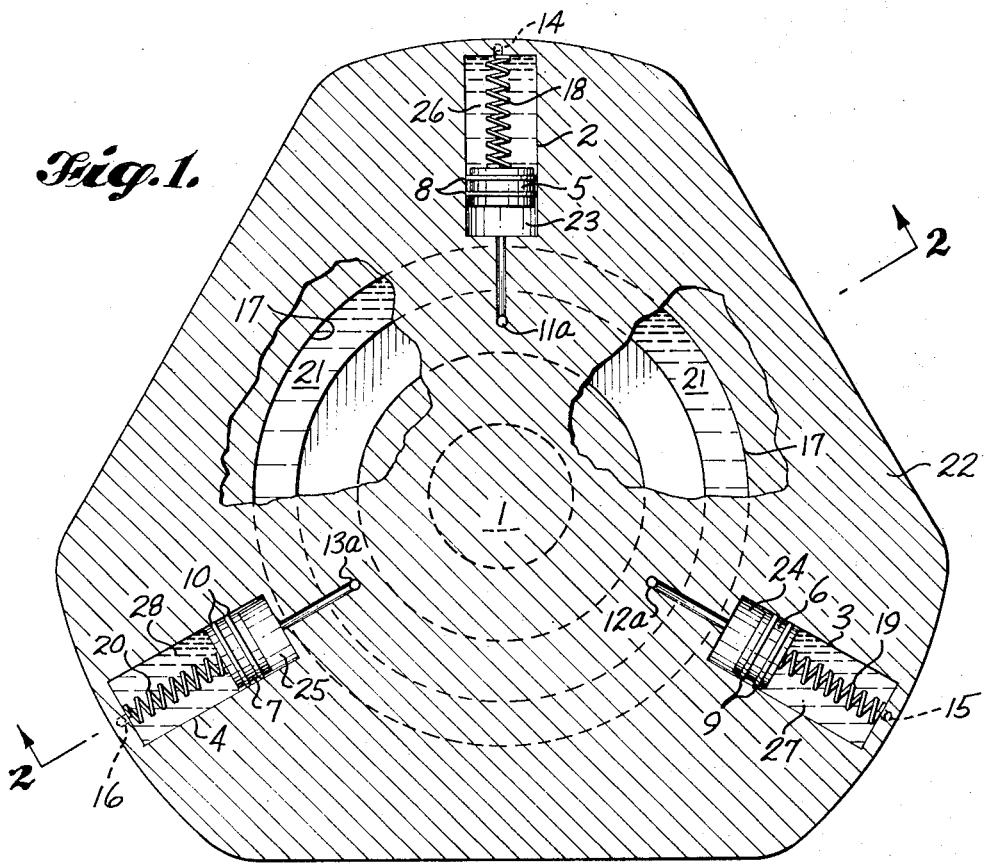
FIG. 1 represents a top view of the preferred embodiment of this invention while rotating slowly with no out of balance situation present.
Figure 2:
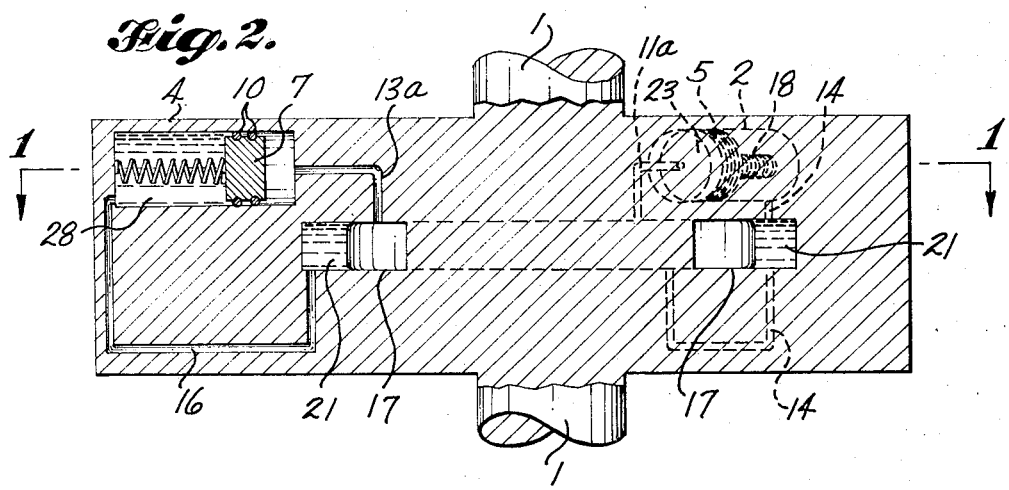
FIG. 2 represents a cross section of the device shown in FIG. 1 taken along lines 2—2 of FIG. 1.

Referring more particularly to the drawings there is seen in FIGS. 1 through 6 a rotational balancer comprising a rotational balancer body 22 carried by shaft 1. Three cylinders 2, 3 and 4 are spaced about the shaft 1. The cylinders 2, 3 and 4 each contain a piston 5, 6 and 7, respectively, having seal rings 8, 9 and 10 to provide a liquid-tight seal with the walls of cylinders 2, 3 and 4. Springs 18, 19 and 20 urge pistons 5, 6 and 7 respectively, inwardly toward the geometric center of rotation of the body 22. An annular fluid reservoir 17 is disposed concentrically about shaft 1 in the rotational balancer body. Inner fluid chambers 23, 24 and 25 and outer liquid chambers 26, 27 and 28 are each in individual fluid communication with the reservoir 17, the inner fluid chambers through ports 11, 12 and 13 respectively and the outer chambers through channels 14, 15 and 16. Ports 11, 12 and 13 lie on a circle concentric with shaft 1. A liquid 21 occupies a portion of the reservoir 17 and fills the outer liquid chambers 26, 27 and 28. The remainder of reservoir 17 is filled with a suitable gas such as air.

FIG. 5 shows an enlarged view of the cylinder 2, in which the piston 5 has traveled to the outer end of cylinder 2 under the influence of centrifugal force causing spring 18 to be completely collapsed against the outer wall of cylinder 2. The liquid which was contained in outer chamber 28 has for the most part been forced back into the reservoir 17 through outer liquid conduit 14. A portion of the inner fluid chamber 23 is filled with liquid 21 to a depth which can be evaluated by reading the location of the liquid-gas interface 29 on scale 31. By reading the corresponding amount of liquid in each cylinder the location and amount of imbalance can be determined.

OPERATION OF THE PREFERRED EMBODIMENT

The device of this invention operates in the following manner. In FIG. 1 is shown the device rotating at a low rate of angular velocity insufficient for centrifugal forces to overcome the spring forces to cause pistons 5, 6 and 7 to move outwardly. The device is shown in rotational balance about the center of shaft 1. The liquid 21 contained in the reservoir 17 assumes a toroidal configuration concentric about the center of shaft 1. In FIG. 3 the device is shown rotating at a low rate of angular velocity with a weight 32 imposed off center of the device causing the center of mass to shift from the center of shaft 1 to a new location 33. If the balancer is permitted to move in a plane perpendicular to shaft 1 while rotating, the point 33 or some point between 33 and the center of shaft 1 will become the center of rotation of the device and the liquid 21 will assume a configuration the inner circumference of which is concentric about point 33 on the interior, but with its outer shape defined by the outer wall of reservoir 17. This change in location of the fluid in itself causes a counterbalancing shift of mass with regard to weight 32 resulting in a partial counterbalancing of the weight 32. In this condition ports 11 and 12 are observed to be in an area of the reservoir 17 in which no liquid is present, however, port 13 is covered by liquid 21.

As the rate of angular velocity of the device increases, pistons 5, 6 and 7 are thrown outwardly from the center of rotation due to centrifugal forces overcoming the inwardly directed force of springs 18, 19 and 20. The outward piston motion causes the liquid in outer chambers 26, 27 and 28 to flow through outer fluid conduits 14, 15 and 16 back into the reservoir 17. At the same time, liquid is entering port 13 but air is entering ports 11 and 12. The inside diameter of the liquid in reservoir 17 is of course decreasing due to the fluid entering reservoir 17 from the outer chambers 26, 27 and 28. Liquid continues to enter port 13 until the shift of location of the liquid moves the center of mass of the rotating body inwardly towards the center of shaft 1, since the weight 32 is counterbalanced by the liquid present in the inner fluid chamber 25. Only that amount of liquid necessary to counterbalance weight 32 will enter fluid chamber 25 since air will begin to enter all chambers as the center of rotation returns to the geometric center of shaft 1 and the liquid in reservoir 17 assumes an annular configuration concentric with shaft 1. At that point the system will be in balance and any liquid forced out of the outer chambers which must enter the inner chambers will be evenly distributed among the inner chambers disposed about the device. In this manner perfect rotational balance is attained in the rotating member automatically with no requirement for observation or manipulation by an operator.

In FIG. 4 a rotational balancer is shown rotating at a high rate of speed with the mass 32 completely compensated by the liquid contained in inner fluid chamber 25. The inner fluid chamber 25 is partly filled with liquid 21 and partly with air, the air-liquid interface shown at 29. Each of the other inner fluid chambers contains a small amount of liquid 21 since an equal amount of liquid enters each cylinder after sufficient liquid has entered the cylinder or cylinders opposite the unbalanced mass to compensate for the unbalanced mass and cause the rotational center of mass to again coincide with the geometrical center of rotation.

The amount and location of out of balance may be determined by evaluating the amount of liquid in each of the three chambers. The liquid will, of course, assume a position adjacent the piston 5 as shown in FIG. 5 due to centrifugal forces and the location of the interface 29 between the air and the liquid may be readily read on scale 31 through the use of a strobe light, high speed photographic techniques or other methods well known in the art. By reading each of the liquid levels in the three cylinders, it is possible to determine the angular location and the equivalent weight necessary to counterbalance the out of balance observed by the device.

In applications wherein a short shaft is utilized or in which very little travel of shaft 1 in a lateral direction is possible, unusual standing wave effects are observed in the liquid contained in reservoir 17. Such liquid effects occasionally make it necessary to move the location of inner fluid ports 11, 12 and 13 to a different angular location to optimize the operation of the rotational balancer. FIGS. 7, 8 and 9 show one device which has been found suitable for changing the location of the inner fluid ports.

Disc 34 is used to relocate the apertures through which fluid in the reservoir 17 is drawn into the cylinders 2, 3 and 4. Three grooves 36, 37 and 38 concentric with the center of shaft 1 are provided in disc 34. The grooves each communicate with an inner fluid port 39, 40 and 41 located on a circle concentric with shaft 1. Each groove in turn communicates with a single cylinder as shown in FIG. 9. By rotation of the disc, the location of fluid pickup for each cylinder in fluid reservoir 17 may be altered to compensate for standing wave or other interference phenomena observed when the motion of the rotational balancer in a plane perpendicular to shaft 1 is restrained. FIG. 9 shows the assembled balancer with the disc 34 in place inside reservoir 17. The grooves 36, 37 and 38 are separated and sealed from each other by sealing rings 48, 49 and 50 which are of the O-ring type. Cylinder 2 communicates with groove 38 through port 45 and thence to reservoir 17 through groove port 43 and inner fluid port 40. Cylinder 3 communicates with groove 36 through port 46 and thence to reservoir 17 through groove port 44 and inner fluid port 41. Cylinder 4 communicates with groove 37 through port 47 and thence to reservoir 17 through groove port 42 and inner fluid port 39. The disc 34 may thus be rotated to any angular location to permit pickup of the necessary fluid to cause balancing of the device while rotating. Of course groove ports 42, 43 and 44 and inner fluid ports 39, 40 and 41 need not be equally spaced. Their location may similarly be altered during fabrication as necessary to properly pickup the fluid required for complete and proper balancing of the rotational balancer.

USES FOR THE INVENTION

Many applications of the device of this invention will be apparent to one skilled in the art. For example, the device may be used as a rotational balancer per se. In this application a model of the device as shown in FIG. 1 is attached directly to the rotating member to be balanced. The device contains a suitable fluid for the application such as mercury for heavy rotational equipment traveling at a low rate of speed or a lighter liquid material for application such as high speed gyroscopes and similar devices. Any amount of counterbalancing weight can be obtained simply by designing the size of the various components and the number of chambers disposed about the rotating body to fit the application. For example, in heavy rotating equipment such as power generators, steam generating equipment, ships' propellers and similar heavy equipment devices, a large reservoir 17 with many large chambers utilizing liquid of high specific gravity may be found necessary to offset the large out of balance situations occasionally encountered in such heavy rotating equipment. For light applications such as rapidly rotating gyroscopes, electric motor armatures and the like, a smaller rotational balancer having closer tolerances and utilizing light oil, water, alcohol or the like could be applied to meet the specific requirements of high rotation speed instrument applications.

In large, heavy rotating equipment catastrophic failures could be avoided by employing a reinitializing system which would permit use of the rotational balancer without stopping the rotating equipment. Such a system would be necessary since it is required that the pistons in each chamber travel from a first rest position to a second position in order to draw the necessary amount of liquid into the proper chamber or chambers to counterbalance the unbalanced mass. Suitable reinitializing systems could be, for example, an electromagnetic device or simple mechanical linkage which would force the piston inwardly to a rest position and then permit the piston to travel out its full distance of travel to the end of each of the respective chambers. Another method would be to hold the pistons in their innermost positions as shown in FIG. 1 until an out of balance condition is sensed by the operator or by equipment adapted to such purpose. At that time the pistons would be released, permitting them to travel outwardly under the influence of centrifugal forces to counterbalance the out of balance situation and return the center of mass into coincidence with the center of rotation.

Other embodiments of this invention would permit the achieving of rotational balance while rotating at a continuous rotational velocity would include those for inducing a small amount of motion of the pistons after the device has achieved its rotational speed. Examples would be mechanical or electromechanical linkages which can cause a small motion of the pistons at will. After the initial balancing action takes place by movement of the pistons outwardly a certain amount of their maximum travel, say 50%, then any subsequent small change in rotational balance can be compensated by a minor outward movement of the pistons which causes liquid to flow back into the fluid reservoir and into the chamber or chambers opposite the unbalanced mass.

Another suitable means of achieving fine adjustment of the rotational balance would be to use a spring having two or more spring constants along its length or to use two or more springs of different lengths so that the pistons would move from their first or rest position to a second position at an initial angular velocity. The balancer would operate to establish rotational balance in this first movement. If the device or rotating member on which the device is attached becomes out of balance, the angular velocity of the device could be increased so that the centrifugal forces overcome the force of the second segment of the spring means and the piston moves out to a third position, causing the device to again seek equilibrium.

The device will of course attain a certain amount of readjustment of the location of the liquid while operating if the device becomes unbalanced while rotating. This readjustment comes about due to the liquid in the reservoir 17 seeking a toroidal shape about the center of rotation which is non-coincident with the geometric center when the rotary balancer is out of balance. In that situation a small amount of liquid will enter the port or ports opposite the unbalanced mass since the liquid would only partially cover the port. Liquid would flow due to the influence of centrifugal forces and since the centrifugal forces would cause the liquid to cling to the outer wall of the ducts and chambers, air would flow back into the vessel 17 to replace the liquid which has entered the chamber or chambers opposite the unbalanced weight. As a result, a certain degree of readjustment of the mass of the rotating body would occur.

The adjustment outlined in the preceding paragraph may be augmented by providing means to add an additional small quantity of liquid to the vessel 17 while the device is rotating. One means might be a mechanically operated liquid storage cell and pump apparatus adapted to place additional fluid in the chamber. Lubricating oil, if used for the balancer liquid 21, could be forced into the fluid reservoir by any suitable means responsive to an out of balance situation.

Use of a rotational balancer with a suitable reinitializing or stepwise type operation would frequently result in avoiding heavy damage to large rotating equipment such as generators or gas turbine engines when a portion of the rotating apparatus fails and the center of mass of the rotating member suddenly shifts to a new location. Catastrophic failures of rotating equipment such as airplane jet engines could thus be frequently avoided and the airplane be safely returned to its base for repairs.

This invention has many potential applications as a diagnostic tool for mechanical construction of rotating members to evaluate and locate imbalance in the rotating member and to determine the amount and location of counterbalance necessary to provide perfect rotational balance. The automotive industry is but one example of many such applications. The device could be used to evaluate new or reground crankshafts for rotational balance. Large and small drive shafts, gears, clutch assemblies, flywheels, automotive wheels, hubs, tire and wheel assemblies and the multitude of other rotation elements could easily, quickly and very accurately be checked for essential rotational balance.

The accuracy of construction vis-a-vis rotative balance of heavy rotating equipment from helicopter rotors to high speed generator armatures can readily be tested by use of this device.

For specialized application in which it is known in advance that an unbalanced mass will be present at a known or approximately known angular location, the cylinders need not be spaced equally around the rotational balancer's center of rotation. Rather it would be possible to position one or more cylinders opposite the known unbalanced mass to effectively counterbalance this mass without having cylinders placed adjacent the unbalanced mass. Thus any combination of locations of the cylinders is possible to meet the conditions and system to which the rotational balancer concept is applied.

I claim:

1. A rotating system including a rotatable body having therein one or more fluid accumulators distributed about the axis of rotation of said body; a fluid reservoir partially filled with a liquid disposed about said axis; fluid passageways connecting each of said fluid accumulators with said reservoir at a location intermediate the outer periphery of said reservoir and said axis means to enlarge the volume of said fluid accumulators during rotation of said body; such that said fluid is distributed into said accumulators variably in accordance with dynamic unbalance of the rotating system so as to return the rotating system toward rotational balance.

2. The apparatus of claim 1 wherein said accumulators comprise chambers having movable partition elements disposed therein defining a first and second portion of said chambers.

3. The apparatus of claim 1 wherein said passageways connecting said accumulators and said reservoir all enter said reservoir at the same radial distance from said axis.

4. The apparatus of claim 2 wherein said first portion communicates with said fluid reservoir at a first radial distance from said axis and said second portion communicates with said reservoir at a second radial distance from said axis, said second radial distance exceeding said first radial distance.

5. The apparatus of claim 2 wherein said chambers are oriented to induce movement of said movable partition elements by centrifugal forces resulting from rotation of said rotating system, said movement increasing the volume of said first portion and decreasing the volume of said second portion, said movable partition elements being biased toward said first portion.

6. The apparatus of claim 1 and means to inject additional liquid into said reservoir during rotation.

7. The apparatus of claim 1 wherein said fluid reservoir comprises a volume of revolution disposed concentrically about said axis.

8. A rotational balancer system for operation at rotational speeds above the critical speed of said system comprising: a rotatively mounted body, said body having a reservoir disposed about the geometric center of rotation of said body, said reservoir being partially filled with a liquid; a plurality of chambers disposed in said body, said chambers each being in fluid communication with said reservoir at a point substantially on a radius between said chamber and said axis and located between the outer wall of said reservoir and said geometric center; means to inject additional liquid into said reservoir during rotation; and means to draw liquid from said reservoir into said chambers variably in accordance with the dynamic unbalance of said rotational balancer system whereby said rotational balancer system is returned toward rotational balance.

9. The apparatus of claim 8 wherein said plurality of chambers each contain a movable partition element defining a first portion and a second portion.

10. The apparatus of claim 9 wherein both portions of said chambers are in fluid communication with said reservoir.

11. The apparatus of claim 9 wherein said plurality of chambers is constructed and arranged to permit movement of said movable partition elements by centrifugal forces induced by rotation of said rotating system to enlarge said first portion of said chamber whereby fluid from said reservoir is drawn thereinto and fluid from said second portion is injected into said reservoir, said partition elements being biased to provide opposition to centrifugal forces.

12. The apparatus of claim 8 wherein said fluid reservoir comprises a volume of revolution disposed concentrically about said axis.

13. An apparatus for automatically balancing a rotatable body having an unbalanced mass eccentrically located with respect to the axis of rotation of said body comprising: a fluid reservoir disposed about said axis, said reservoir being partly filled with a liquid; and, at least one fluid accumulator in said apparatus having means to draw fluid thereinto and being located eccentric to said axis, each fluid accumulator being individually in fluid communication with said fluid reservoir at a fluid entrance intermediate the periphery of said reservoir and said axis so that when said apparatus is rotating liquid covers said fluid entrance for that fluid accumulator opposite said unbalanced mass whereby liquid from said fluid reservoir is drawn by said means into said fluid accumulator positioned opposite said unbalanced mass to at least partially counterbalance said unbalanced mass.

14. The apparatus of claim 15 wherein said first portion is in fluid communication with said reservoir at a first radial distance and said second portion has a liquid conduit extending between said second portion and said reservoir entering said reservoir at a second radial distance exceeding said first radial distance so that said first portion is selectively filled with either gas or liquid from said fluid reservoir in response to dynamic imbalance of said body upon movement of said piston to enlarge the volume of said first portion whereas said second portion remains filled with liquid at all times, movement of said piston to enlarge said first portion causing a decrease in volume of said second portion forcing liquid from said second portion into said reservoir to be selectively introduced into said first portion of an accumulator opposite an unbalanced mass upon further movement of said piston.

15. The apparatus of claim 13 wherein said fluid accumulator comprises an elongated chamber containing a movable piston means defining a first portion and a second portion of said fluid chamber.

16. The apparatus of claim 15 wherein said means to draw fluid comprises movement of said pistons under influence of centrifugal forces resulting from rotative motion of said body, said pistons being biased to provide opposition to centrifugal forces.

17. The apparatus of claim 13 wherein each of said elongated chambers is oriented with its axis substantially along a radius of said body.

18. The apparatus of claim 13 having means to add liquid to said reservoir during rotation.

19. The apparatus of claim 13 wherein said fluid reservoir comprises a volume of revolution disposed concentrically about said axis.

20. An apparatus for automatically balancing a rotating member and simultaneously evaluating the amount and location of unbalanced mass of the rotating member comprising: a balancer body mounted upon said rotating member so that the geometric axis of rotation thereof is coincident with the geometric axis of rotation of said rotating member; a fluid reservoir disposed about the geometric axis of rotation of said body, said reservoir partially filled with a fluid of higher density and partly filled with a fluid of lower density said fluids assuming a configuration concentric about the actual center of rotation when the body is rotating; a plurality of fluid chambers eccentrically mounted in said body, each of said chambers containing a movable piston means biased toward a first end of said chamber, said first end being interconnected for fluid flow with said fluid reservoir at a radial distance between the outer periphery of said fluid reservoir and said axis of rotation, and a second end of each of said chambers being interconnected for fluid flow with said fluid reservoir, substantially at the periphery of said reservoir, said first end and said second end being separated from each other by said piston means; means to move said piston means from position adjacent said first end toward said second end such that fluid from said fluid reservoir is drawn into said first end of each of said chambers and fluid is expelled from said second end of each of said chambers into said fluid reservoir, the desired balancing effect occurring as a chamber opposite an unbalanced mass of the rotating member draws fluid of higher density from the fluid reservoir into the first end thereof and a chamber adjacent the unbalanced mass draws fluids of lower density from the fluid reservoir into the first end thereof due to the geometric configuration assumed by the fluids contained in said reservoir upon rotation of said member, the amount and location of imbalance being indicated by the relative amounts of liquid contained in each chamber.

21. The apparatus of claim 20 wherein said fluid reservoir comprises a volume of revolution disposed concentrically about said axis.

22. The apparatus of claim 20 wherein said chambers are oriented with said first end nearest to said axis of rotation and said second end furthest from said axis of rotation.

23. The apparatus of claim 20 wherein said piston is biased toward the axis of rotation and said means to draw fluid thereinto comprises outward movement of said piston due to centrifugal forces.

* * * * *